(12) United States Patent
Lee et al.

(10) Patent No.: US 8,190,831 B2
(45) Date of Patent: May 29, 2012

(54) METHODS AND APPARATUS FOR DETECTING A SYNCMARK IN A HARD DISK DRIVE

(75) Inventors: Yuan Xing Lee, Santa Jose, CA (US); Fuminori Sai, Yukohama (JP); Shaohua Yang, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 364 days.

(21) Appl. No.: 12/262,550

(22) Filed: Oct. 31, 2008

(65) Prior Publication Data
US 2010/0115209 A1    May 6, 2010

(51) Int. Cl.
*G06F 13/00* (2006.01)
(52) U.S. Cl. .......... 711/154; 711/112; 360/48; 360/72.1
(58) Field of Classification Search .................. 711/112, 711/154; 360/48, 72.1
See application file for complete search history.

(56) References Cited

U.S. PATENT DOCUMENTS

| | | | |
|---|---|---|---|
| 5,844,920 A | 12/1998 | Zook et al. | |
| 6,124,994 A | 9/2000 | Malone, Sr. | |
| 6,711,225 B1 | 3/2004 | Sutardja et al. | |
| 7,835,105 B1 * | 11/2010 | Sutardja | 360/75 |
| 2004/0212912 A1 | 10/2004 | Okamoto et al. | |
| 2007/0223135 A1 * | 9/2007 | Kudo et al. | 360/78.04 |

FOREIGN PATENT DOCUMENTS

| | | |
|---|---|---|
| EP | 0 863 507 A2 | 9/1998 |
| EP | 1 603 134 A1 | 12/2005 |
| JP | 2001143406 | 5/2001 |
| WO | WO 98/14936 | 4/1998 |

OTHER PUBLICATIONS

Yeo et al., "VLSI Architectures for Iterative Decoders in Magnetic Recording Channels," IEEE Transactions on Magnetics, vol. 37, No. 2, pp. 748-755 (Mar. 2001).

* cited by examiner

*Primary Examiner* — Reba I Elmore

(57) ABSTRACT

Methods and apparatus are provided for detecting a syncMark in a read channel, such as a hard disk drive. A syncMark is detected in a sector in an iterative read channel by obtaining a sector signal from a storage media, the sector signal comprising a first syncMark, data and a second syncMark substantially at an end of the sector; determining whether the first syncMark is detected in the sector signal; searching for the second syncMark if the first syncMark is not detected in the sector signal; and detecting and decoding the sector signal based on a detection of the second syncMark. The second syncMark may be positioned, for example, following data in the sector signal. The second syncMark can be searched for in a window within the signal sector that is based on an estimated location of the first syncMark.

21 Claims, 3 Drawing Sheets

METHODS AND APPARATUS FOR DETECTING A SYNCMARK IN A HARD DISK DRIVE

FIELD OF THE INVENTION

The present invention is related to techniques for syncMark detection techniques in a hard disk drive and, more particularly, to techniques for detecting a second syncMark in a hard disk drive when the first syncMark is not detected.

BACKGROUND OF THE INVENTION

Storage systems, such as disk drives, typically include one or more disks or other storage media with a plurality of concentric data tracks. A transducer is typically positioned over a destination track during a write or read operation. Servo head position information is typically recorded on the disk. One common recording format 100 for disk drives, shown in FIG. 1, includes a servo address mark (SAM) pattern 110 that identifies the start of the next set of embedded servo information, as well as a syncMark pattern 120 and a postamble pattern 130 before and after the recorded data 140, respectively.

Typically, a servo demodulator determines where to start searching for a SAM pattern based on the most recently detected SAM. Typically, the servo demodulator searches for the SAM during a time window that is based on the timing of the most recently detected SAM. Once the SAM is detected, the spacing between the SAM and the syncMark is typically known with a high degree of accuracy. Thus, a syncMark location detector can typically search for the syncMark within a relatively small window. Once the syncMark is identified, the syncMark location detector can determine where the data section is located within the recording track.

The syncMark detector could miss detecting the syncMark, for example, due to signal defects where the read-back signal on the syncMark is destroyed or distorted beyond the tolerance of the syncMark detector. A number of techniques have been proposed or suggested for recovering from a failure to detect a syncMark. For example, one technique shown in FIG. 2 inserts a secondary syncMark 240 (often referred to as syncMark2 or SM2) in the data. When the syncMark detector fails to detect the first syncMark 110, the hard disk drive can rely on the second syncMark 240 to locate and detect the data. The first syncMark 110 and second syncMark 240 are typically separated by a constant length. Typically, a buffer sufficient to store the data between the first and second syncMarks 110, 240 is used to recover the data on the fly for the missing syncMark. The second syncMark 240, however, must be inserted into the data and thus impairs the format efficiency, resulting in a reduced data capacity relative to the technique of FIG. 1.

A need therefore exists for improved techniques for recovering from a failure to detect a syncMark in a hard disk drive.

SUMMARY OF THE INVENTION

Generally, methods and apparatus are provided for detecting a syncMark in a read channel, such as a hard disk drive. According to one aspect of the invention, at least one syncMark is detected in a sector in an iterative read channel by obtaining a sector signal from a storage media, the sector signal comprising a first syncMark, data and a second syncMark substantially at an end of the sector; determining whether the first syncMark is detected in the sector signal; searching for the second syncMark if the first syncMark is not detected in the sector signal; and detecting and decoding the sector signal based on a detection of the second syncMark.

The second syncMark may be positioned, for example, following data in the sector signal, such as where a postamble pattern would be positioned according to one or more conventional techniques. The second syncMark can be searched for in a window within the signal sector. The window can be based, for example, on an estimated location of the first syncMark.

A more complete understanding of the present invention, as well as further features and advantages of the present invention, will be obtained by reference to the following detailed description and drawings.

DETAILED DESCRIPTION

Figure 3:
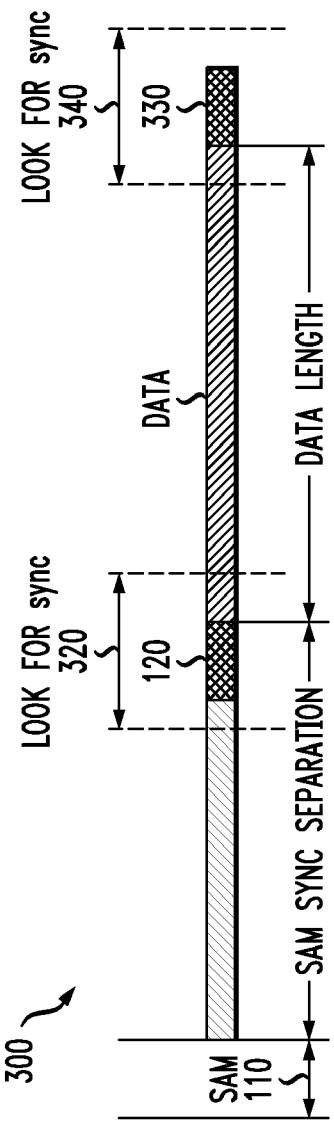
FIG. 3 illustrates an exemplary recording format for disk drives that incorporates features of the present invention.

The present invention provides improved techniques for recovering from a failure to detect a syncMark in a hard disk drive. According to one aspect of the invention, a second syncMark is written at the end of a sector, in the place of a postamble 130. FIG. 3 illustrates an exemplary recording format 300 for disk drives that incorporates features of the present invention. As shown in FIG. 3, the disclosed recording format 300 includes a servo address mark (SAM) pattern 110 that identifies the start of the next set of embedded servo information, as well as a first syncMark pattern 120, in a similar manner to FIG. 1.

Figure 1:
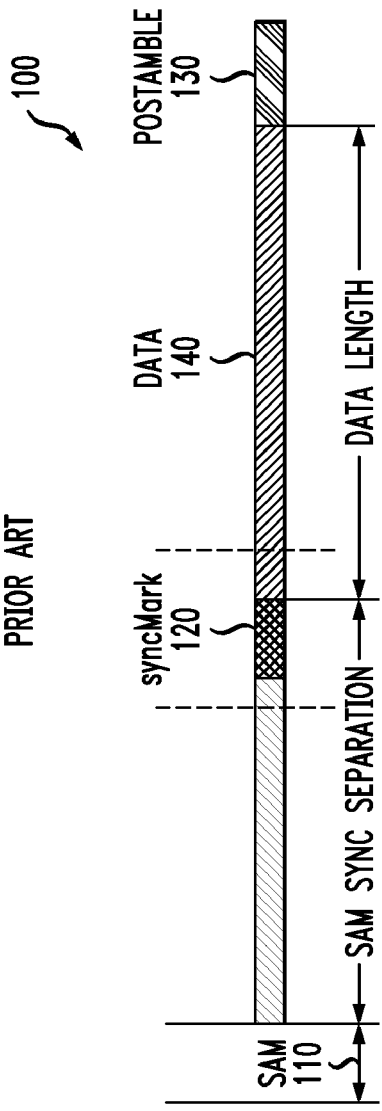
FIG. 1 illustrates an exemplary conventional recording format for disk drives.
Figure 2:
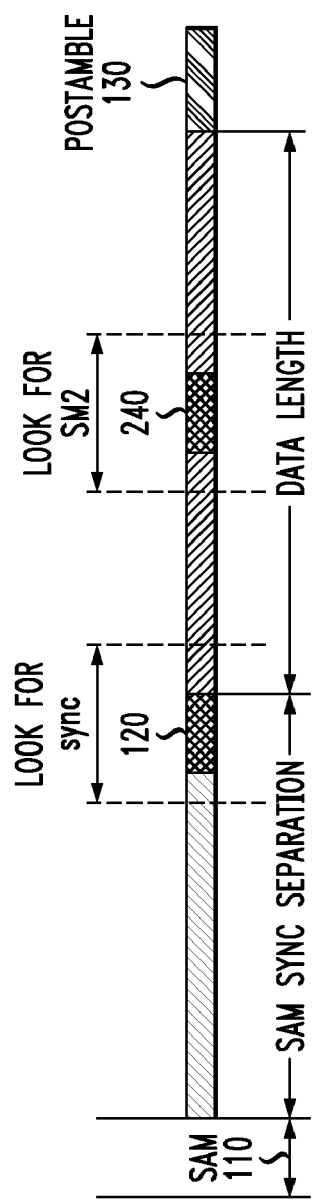
FIG. 2 illustrates an alternative exemplary conventional recording format for disk drives.

In addition, the disclosed recording format 300 includes a second syncMark pattern 330 at the end of a sector, where a postamble pattern 130 would normally be expected in the format of FIG. 1. In this manner, the disclosed recording format 300 allows the second syncMark pattern 330 to be detected, when the first syncMark pattern 120 is missed by the hard disk drive. Thus, the present invention allows recovery of the data on the fly, without reducing the data capacity relative to the format of FIG. 1. According to another aspect of the invention, the maximal separation between the two syncMarks 120, 300 provides the most reliable protection against media defects and other factors causing the detection of the syncMark to fail.

Hard disk drive coders/decoders (codecs) can typically retain a complete sector of received signals and detected data for multiple decoding iterations. The decoding process typically involves multiple stages of detection and decoding, in a known manner. Generally, as discussed further below in conjunction with an exemplary embodiment in FIG. 5, if the syncMark 120 is not detected by the syncMark detector, the estimated location of the syncMark 120 is used as if the syncMark 120 is detected. In this case, however, the syncMark detector attempts to find the second syncMark at the end of the sector using the "look for second sync" window 340 based on the data length (i.e., the expected separation between the first and second syncMarks 120, 330).

If the second syncMark pattern 330 at the end of the sector is found within the specified window, and at a location that is consistent with the location of the first syncMark 120, then the estimated syncMark location has been confirmed, and the hard disk drive does normal detection/decoding based on the estimated syncMark location.

If the second syncMark pattern 330 at the end of the sector is not found within the specified window, and at a location that is consistent with the location of the first syncMark 120, then the estimated syncMark location is confirmed to be inaccurate, and the correct syncMark location or data start point can be determined by the location of the second end-of-sector syncMark 330. In this case, the hard disk drive needs to re-align the received signal and detected data. The re-aligned signal and data could be used for detecting and decoding the data in the second and subsequent iterations. The data re-alignment typically only involves memory address pointer shifts.

Figure 4:
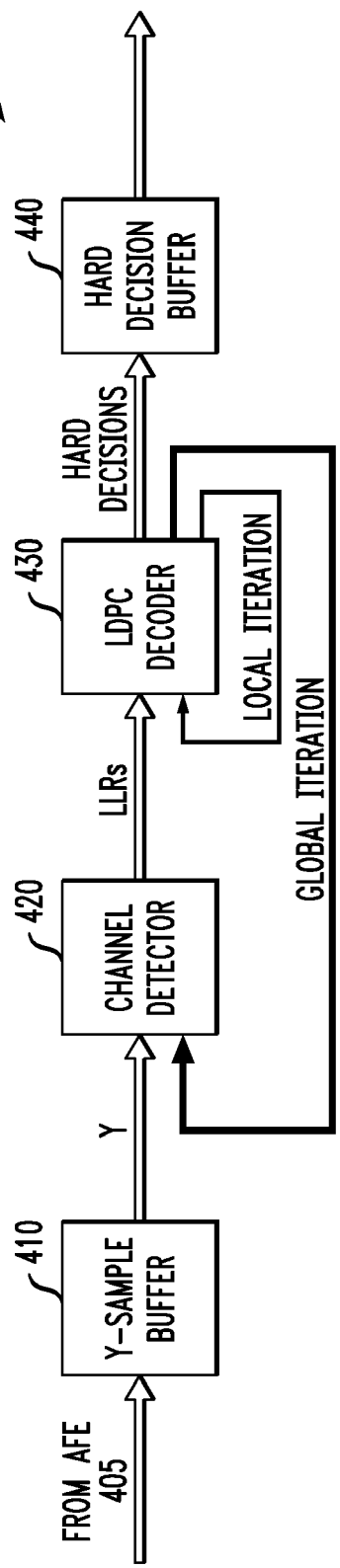
FIG. 4 is a schematic block diagram of an exemplary iterative hard disk drive.

FIG. 4 is a schematic block diagram of an exemplary iterative hard disk drive 400. As shown in FIG. 4, an analog and digital front end 405 generates equalized samples, Y. For example, the equalized samples, Y, may be obtained after a finite impulse response (FIR) filtering. For a detailed discussion of conventional iterative decoding techniques, see for example, E. Yeo et al., "VLSI Architectures for Iterative Decoders in Magnetic Recording Channels," IEEE Trans. on Magnetics, Vol. 37, No. 2, March 2001, incorporated by reference herein.

A soft channel detector 420 processes the equalized samples, Y, and generates a series of reliability information for each Y sample in the form of soft bit decisions, such as log likelihood ratios (LLRs). The LLR values are processed by an LPDC decoder 430, in a known iterative manner, to generate hard and soft decisions that are stored in a buffer 440. Generally, a hard bit decision is closely related to the detector and decoder soft output (LLR) values. Likewise, the magnitude of the detector and decoder output LLR values provides an indication of the reliability of the decision.

As previously indicated, the decoding process typically involves multiple stages of detection and decoding, in a known manner. The LPDC decoder 430 employs local iterations, and between the LDPC decoder and the soft channel detector 420 global iterations are employed if the decoding does not converge within LDPC decoder local iterations. For each global iteration, the decoder soft outputs (LLRs) 440 are sent back to the detector for another round of detection.

Figure 5:
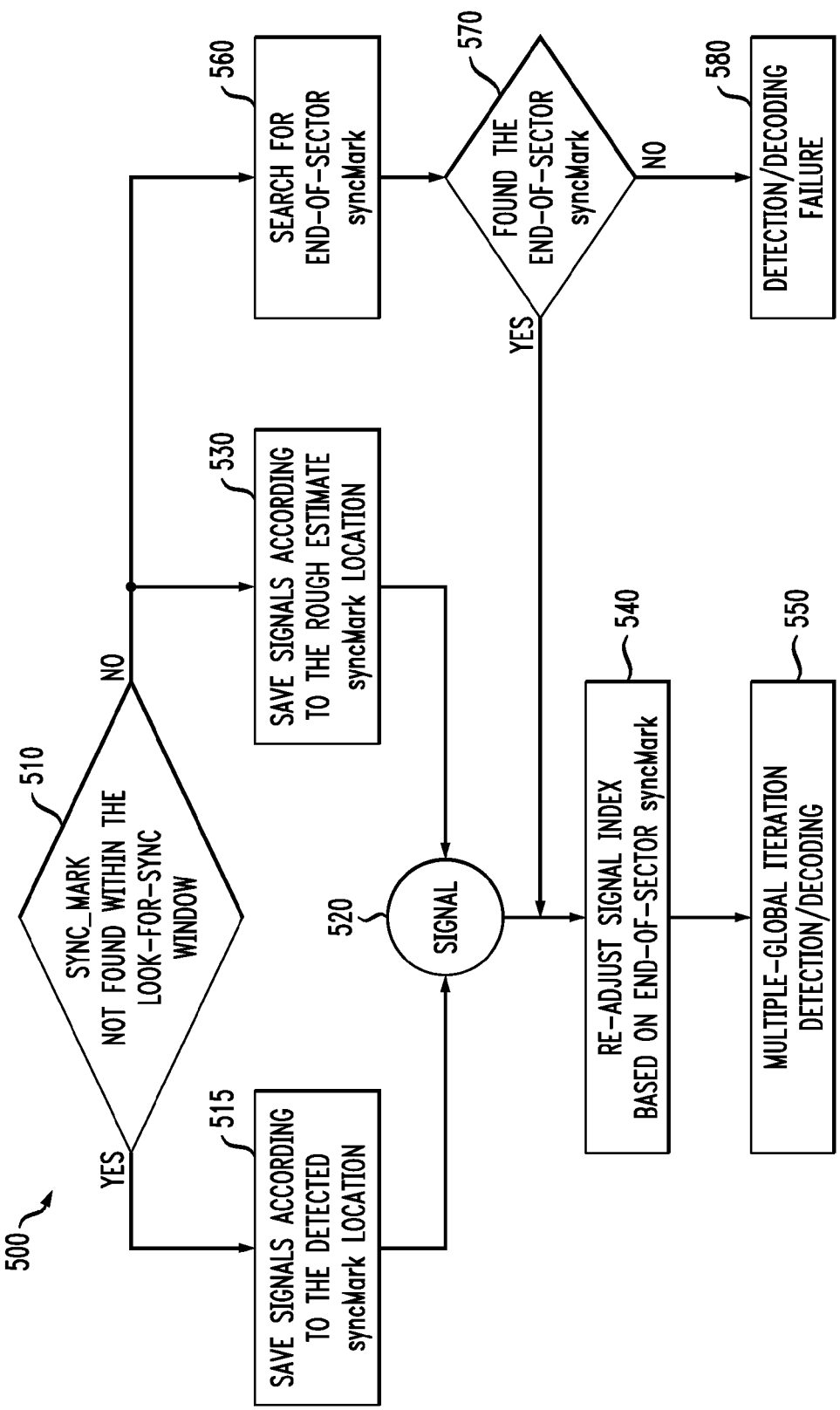
FIG. 5 is a flow chart describing an implementation of an iterative hard disk drive process that incorporates features of the present invention.

FIG. 5 is a flow chart describing an implementation of an iterative hard disk drive process 500 that incorporates features of the present invention. As shown in FIG. 5, the iterative hard disk drive process 500 initially performs a test during step 510 to determine if the first syncMark 120 was found within the window 320. If it is determined during step 510 that the first syncMark 120 was found within the window 320, then the equalized samples (i.e., the signal) is saved during step 515 to memory 520 according to the detected location of the first syncMark 120. Program control then proceeds to step 540, discussed below.

If, however, it is determined during step 510 that the first syncMark 120 was not found within the window 320, then the signal is also saved during step 530 to memory 520 according to an estimate of the location of the first syncMark 120 based on the SAM distance. In addition, a search is initiated during step 560 for the second syncMark 330 within the window 340. A further test is performed during step 570 to determine if the second syncMark 330 was found within the window 340. If it is determined during step 570 that the second syncMark 330 was not found within the window 340, then a detection/decoding failure is optionally declared during step 580, before program control terminates. If the rough estimate of the first syncMark was wrong, detection/decoding can optionally be restarted after re-adjusting the signal index according to the end-of-sector syncMark location. Although one global iteration is lost, the data can still be detected and decoded in the subsequent global iterations and avoid a re-read.

If, however, it is determined during step 570 that the second syncMark 330 was found within the window 340, then program control proceeds to step 540 where the signal index is readjusted based on the detected location of the second syncMark 330. Thereafter, the signal from memory 520 is detected and decoded using multiple global iterations, before program control terminates.

CONCLUSION

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for detecting at least one syncMark in a sector in an iterative read channel, comprising:

obtaining a sector signal from a storage media, said sector signal comprising a first syncMark, data and a second syncMark substantially at an end of said sector;

determining whether said first syncMark is detected in said sector signal;

searching for said second syncMark if said first syncMark is not detected in said sector signal; and detecting and decoding at least a portion of said sector signal preceding said second syncMark based on a detection of said second syncMark.

2. The method of claim 1, wherein said second syncMark follows data in said sector signal.

3. The method of claim 1, wherein said second syncMark is positioned where a postamble pattern would be positioned according to one or more conventional techniques.

4. The method of claim 1, further comprising the step of adjusting a signal index based on said detection of said second syncMark.

5. The method of claim 1, wherein said detecting and decoding step further comprises the steps of performing multiple global iterations of said detecting and decoding.

6. The method of claim 1, wherein said step of searching for said second syncMark searches with a window within said signal sector.

7. The method of claim 6, wherein said window is based on an estimated location of said first syncMark.

8. An iterative read channel, comprising:
- a read head for obtaining a sector signal from a storage media, said sector signal comprising a first syncMark, data and a second syncMark substantially at an end of said sector;
- a memory; and
- at least one processor, coupled to the memory, operative to:
- determine whether said first syncMark is detected in said sector signal;
- search for said second syncMark if said first syncMark is not detected in said sector signal; and
- detect and decoding at least a portion of said sector signal preceding said second syncMark based on a detection of said second syncMark.

9. The iterative read channel of claim 8, wherein said second syncMark follows data in said sector signal.

10. The iterative read channel of claim 8, wherein said second syncMark is positioned where a postamble pattern would be positioned according to one or more conventional techniques.

11. The iterative read channel of claim 8, wherein said processor is further configured to adjust a signal index based on said detection of said second syncMark.

12. The iterative read channel of claim 8, wherein said detection and decoding comprises multiple global iterations of said detecting and decoding.

13. The iterative read channel of claim 8, wherein said second syncMark is searched for in a window within said signal sector.

14. The iterative read channel of claim 13, wherein said window is based on an estimated location of said first syncMark.

15. A method for processing a sector signal obtained from a storage media, said sector signal comprising a first syncMark, data and a second syncMark substantially at an end of said sector, comprising:
- searching for a second syncMark if said first syncMark is not detected in said sector signal; and
- detecting and decoding at least a portion of said sector signal preceding said second syncMark based on a detection of said second syncMark.

16. The method of claim 15, wherein said second syncMark follows data in said sector signal.

17. The method of claim 15, wherein said second syncMark is positioned where a postamble pattern would be positioned according to one or more conventional techniques.

18. The method of claim 15, further comprising the step of adjusting a signal index based on said detection of said second syncMark.

19. The method of claim 15, wherein said step of searching for said second syncMark searches with a window within said signal sector.

20. The method of claim 19, wherein said window is based on an estimated location of said first syncMark.

21. A storage media, comprising:
- a recordable medium for storing a sector signal, said sector signal comprising a first syncMark, data and a second syncMark substantially at an end of said sector, wherein at least a portion of said sector signal preceding said second syncMark is detected and decoded based on a detection of said second syncMark if said first syncMark is not detected in said sector signal.

* * * * *

UNITED STATES PATENT AND TRADEMARK OFFICE
CERTIFICATE OF CORRECTION

PATENT NO. : 8,190,831 B2
APPLICATION NO. : 12/262550
DATED : May 29, 2012
INVENTOR(S) : Yuan Xing Lee, Fuminori Sai and Shaohua Yang Page 1 of 1

It is certified that error appears in the above-identified patent and that said Letters Patent is hereby corrected as shown below:

On the title page, Item (75) inventors section, the portion reading "Santa Jose" should read --San Jose--.

Signed and Sealed this
Twenty-second Day of October, 2013

Teresa Stanek Rea
*Deputy Director of the United States Patent and Trademark Office*